United States Patent
Hindle et al.

(10) Patent No.: US 7,953,523 B2
(45) Date of Patent: May 31, 2011

(54) ACTIVE CONTROL OF SOFT HYBRID ISOLATION SYSTEMS

(75) Inventors: Timothy A. Hindle, Peoria, AZ (US);
Brian J. Hamilton, Glendale, AZ (US);
Louis R. Jackson, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 1110 days.

(21) Appl. No.: 11/687,551

(22) Filed: Mar. 16, 2007

(65) Prior Publication Data
US 2008/0228332 A1    Sep. 18, 2008

(51) Int. Cl.
*B64G 1/36* (2006.01)
(52) U.S. Cl. .......................................................... 701/13
(58) Field of Classification Search ................ 701/3, 13; 244/99.4, 164, 171; 188/378–380; 91/459
See application file for complete search history.

(56) References Cited

U.S. PATENT DOCUMENTS

| | | | |
|---|---|---|---|
| 4,848,525 A | 7/1989 | Jabot et al. | |
| 5,305,981 A | 4/1994 | Cunningham et al. | |
| 6,029,959 A * | 2/2000 | Gran et al. | 267/136 |
| 6,354,576 B1 | 3/2002 | Jacobs et al. | |
| 6,454,215 B1 | 9/2002 | Pedreiro | |
| 2002/0104927 A1 | 8/2002 | Pedreiro | |

OTHER PUBLICATIONS

Thayer, D.; Campbell, M.; Vagners, J.; Flotow, A.; Six-Axis Vibration Isolation System Using Soft Actuators and Multiple Sensors, Mar.-Apr. 2002, vol. 39, No. 2.
EP Search Report, 08101189.2 dated Aug. 19, 2008.

* cited by examiner

*Primary Examiner* — Kim T Nguyen
(74) *Attorney, Agent, or Firm* — Ingrassia Fisher & Lorenz, P.C.

(57) ABSTRACT

Apparatus, Systems, and Methods are provided for controlling motion of a spacecraft. One apparatus includes a non-contacting actuator and a passive mechanical system coupled in parallel with one another. A system includes a payload, a bus, and a hybrid actuator including a non-contacting actuator and a passive mechanical system coupled in parallel, and coupled between the bus and the payload. The system also includes an inertial actuator configured to maneuver the bus to maintain a relative position and/or attitude of the bus with respect to the payload. One method includes receiving a signal instructing a first controller to change the position and/or attitude of a payload and utilizing a hybrid system to change the position and/or attitude of the payload. The method also includes receiving the signal at a second controller and utilizing a system to change a position and/or attitude of the bus independent of the payload.

12 Claims, 4 Drawing Sheets

ACTIVE CONTROL OF SOFT HYBRID ISOLATION SYSTEMS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided by the terms of contract number 30218.

FIELD OF THE INVENTION

The present invention generally relates to spacecraft, and more particularly relates to active control of soft hybrid isolation systems in spacecraft.

BACKGROUND OF THE INVENTION

Traditional agile spacecraft control architectures use an inertial measurement unit (IMU) on the payload to determine the angular orientation of the payload. Spacecraft also include at least one inertial actuator on the bus for applying torques to the spacecraft to control the sensed orientation of the payload (e.g., to follow a prescribed command). The structural connection between the bus and the payload is typically a hexapod of stiff struts.

To attenuate the transmission of bus vibrations to the payload, these struts are sometimes replaced with passive "isolators," which provide tuned stiffness and damping to create a mechanical "break." Because these isolators are located between the inertial actuator and sensor of the attitude control system, the isolators violate co-location protocol and result in an unstable mode. The isolation break frequency must therefore be kept well above the attitude control bandwidth, which minimizes the efficacy of the isolation.

The introduction of an isolated interface also compromises the agility of the spacecraft because high frequency control torques are not passed to the payload. However, agile spacecraft demand control torques whose frequency content not only exceeds the bandwidth of the attitude control system, but also exceeds the break frequencies of the isolation system. This requires active "feedforwards" to high bandwidth torque actuators that are in stiff contact with all parts of the spacecraft.

In some cases, the payload pointing agility required exceeds that of the inertial actuator itself, which is the only source of "inertial torque" available. To meet these demands, the payload should be controlled to move relative to the bus, which results in increased stroke (i.e., displacement) requirements between the payload and the bus.

Accordingly, it is desirable to provide a hybrid actuator for maneuvering a spacecraft payload. In addition, it is desirable to provide a system including a hybrid actuator and an inertial actuator for controlling motion of a spacecraft. Moreover, it is desirable to provide a method for independently controlling a payload and a bus of a spacecraft so that the payload and bus maintain a relative position with respect to one another. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Apparatus are provided for maneuvering a spacecraft payload. One apparatus comprises a non-contacting actuator and a passive mechanical system coupled in parallel with one another.

A system is also provided for controlling motion of a spacecraft. A system includes a payload, a bus, and a hybrid actuator coupled between the payload and the bus, and configured to maneuver a position and/or an attitude of the payload. The hybrid actuator includes a non-contacting actuator and a passive mechanical system coupled in parallel with each other, and coupled between the payload and the bus. The system also includes an inertial actuator configured to maneuver the bus to substantially maintain a relative position and attitude of the bus with respect to the payload.

A method is provided for controlling a spacecraft payload including a first controller, and a spacecraft bus including a second controller. One method includes the steps of receiving a signal instructing a first controller to change a first position and/or a first attitude of the payload. A hybrid system is then utilized to change the first position and/or the first attitude. A second controller also receives the signal, and a different system is utilized to change a position and/or attitude of the bus independent of the payload.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
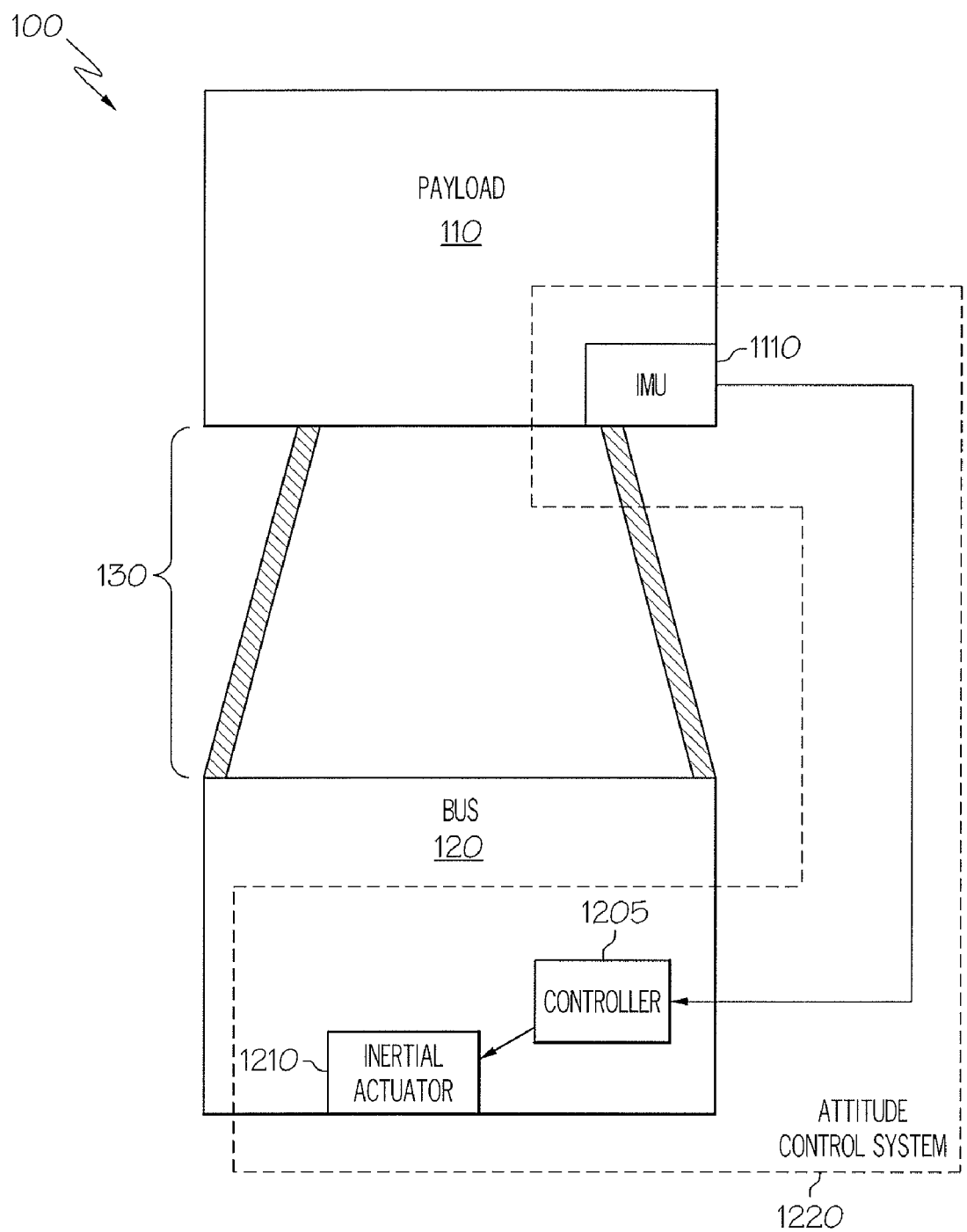
FIG. 1 is a block diagram of a prior art spacecraft.

FIG. 1 is a block diagram of a contemporary spacecraft 100 (e.g., a satellite). Spacecraft 100 includes a payload 110 coupled to a bus 120 via a rigid interface 130 (e.g., a stiff hexapod interface, one or more composite or metal tubes, and/or other similar rigid connecting apparatus).

Payload 110 carries the primary mission hardware (e.g., a telescope, a communications system, a tracking system, and/or other devices or systems needing motion stability and control), and also includes at least one inertial measurement unit (IMU) 1110 (e.g. a star-tracker, a gyroscope, an accelerometer, focal plane detector, and the like). IMU 1110 is configured to detect the position and/or attitude of payload 110 with respect to its surroundings or a target (e.g., the earth, a star, a planet, etc.), and transmits a signal to a controller (discussed below). Errors between the IMU 1110 detected position and/or attitude and a commanded (i.e., desired) position and/or attitude cause controller 1205 to command inertial actuator 1210 (as required) to change the position and/or attitude of spacecraft 100 until IMU 1110 is at the commanded position and/or attitude.

Bus 120 generally stores the items (e.g., power sources, fuel, communications systems, etc.) needed to operate spacecraft 100 properly. A controller 1205 coupled to IMU 1110 is also included on bus 120. Controller 1205 is configured to receive signals from IMU 1110 and instruct various components (e.g., an inertial actuator or attitude control system) to adjust the position and/or attitude of spacecraft 100.

Bus 120 also includes at least one inertial actuator 1210 (e.g., a control moment gyroscope, a thruster, a reaction wheel assembly, a magnetic torquer, a solar sail, and the like) in communication with controller 1205, and configured to adjust the position of spacecraft 100 in response to instructions received from controller 1205 (and IMU 1110). Furthermore, controller 1205 and inertial actuator 1210 form an attitude control system 1220 of spacecraft 100.

Since bus 120 includes various components to adjust the position and/or attitude of spacecraft 100, bus 120 includes the primary sources of vibration in spacecraft 100, which vibrations are propagated to payload 110 (and the mission hardware) via rigid interface 130.

As spacecraft 100 orbits the earth, the position and/or attitude of the mission hardware need to be adjusted to operate properly. When controller 1205 detects that the position and/or attitude of the mission hardware is misaligned and needs to be adjusted (based on an error signal between a commanded position and/or attitude and the IMU 1110 sensed position and/or attitude), controller 1205 transmits a signal to inertial actuator 1210 to maneuver spacecraft 100 to the commanded position and/or attitude. In response, inertial actuator 1210 adjusts the position of spacecraft 100 so that the position and/or attitude of the mission hardware is where it should be, driving the error signal between command and IMU 1110 sensed position and/or attitude to zero.

Because payload 110 is rigidly coupled (via rigid interface 130) to bus 120, the mission hardware is subject to the vibrations created on bus 120. Moreover, because inertial actuator 1210 (i.e., a portion of attitude control system 1220) adjusts the entire spacecraft 100, the position and/or attitude of the mission hardware is changed more slowly than it other wise could be changed.

Figure 2:
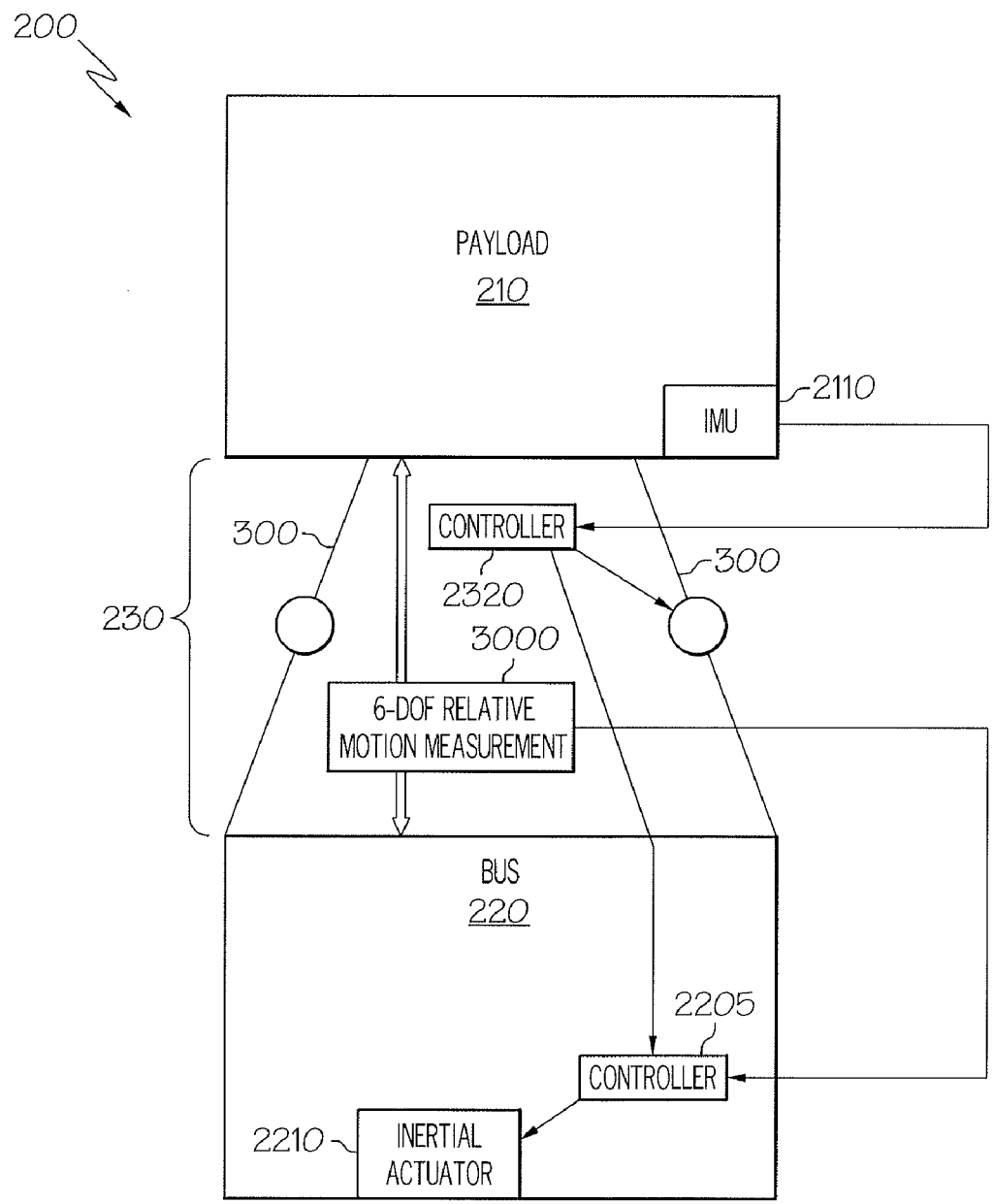
FIG. 2 is a block diagram of one exemplary embodiment of a spacecraft including a hybrid actuator.

FIG. 2 is a block diagram of one exemplary embodiment of a spacecraft 200 including a hybrid interface 230. Spacecraft 200 includes a payload 210 and a bus 220 similar to payload 110 and bus 120, respectively, discussed above with reference to FIG. 1.

As illustrated in FIG. 2, hybrid interface 230 is coupled between payload 210 and bus 220. Hybrid interface 230 includes multiple hybrid actuators 300 (see FIG. 3) coupled between payload 210 and bus 220. Hybrid interface 230 includes six hybrid actuators 300 (in a strut or axial element configuration) forming a hexapod assembly (not shown) configured to maneuver payload 210 in six degrees of freedom (e.g., translation along an X-axis, a Y-axis, and a Z-axis, and rotation about the X-axis, the Y-axis, and the Z-axis). Furthermore, various embodiments contemplate that hybrid interface 230 may include more than six hybrid actuators 300 in a strut or axial element configuration (i.e., an over-constrained configuration).

Hybrid interface also includes a six degrees-of-freedom (6-DOF) relative measurement system 3000 configured to measure the relative position of payload 210 with respect to bus 220, or vice versa. 6-DOF relative measurement system 3000 may be any of a plurality of non-contacting and/or contacting linear and/or angular measurement devices (e.g., non-contacting displacement sensors or the like built into hybrid actuator 300).

Figure 3:
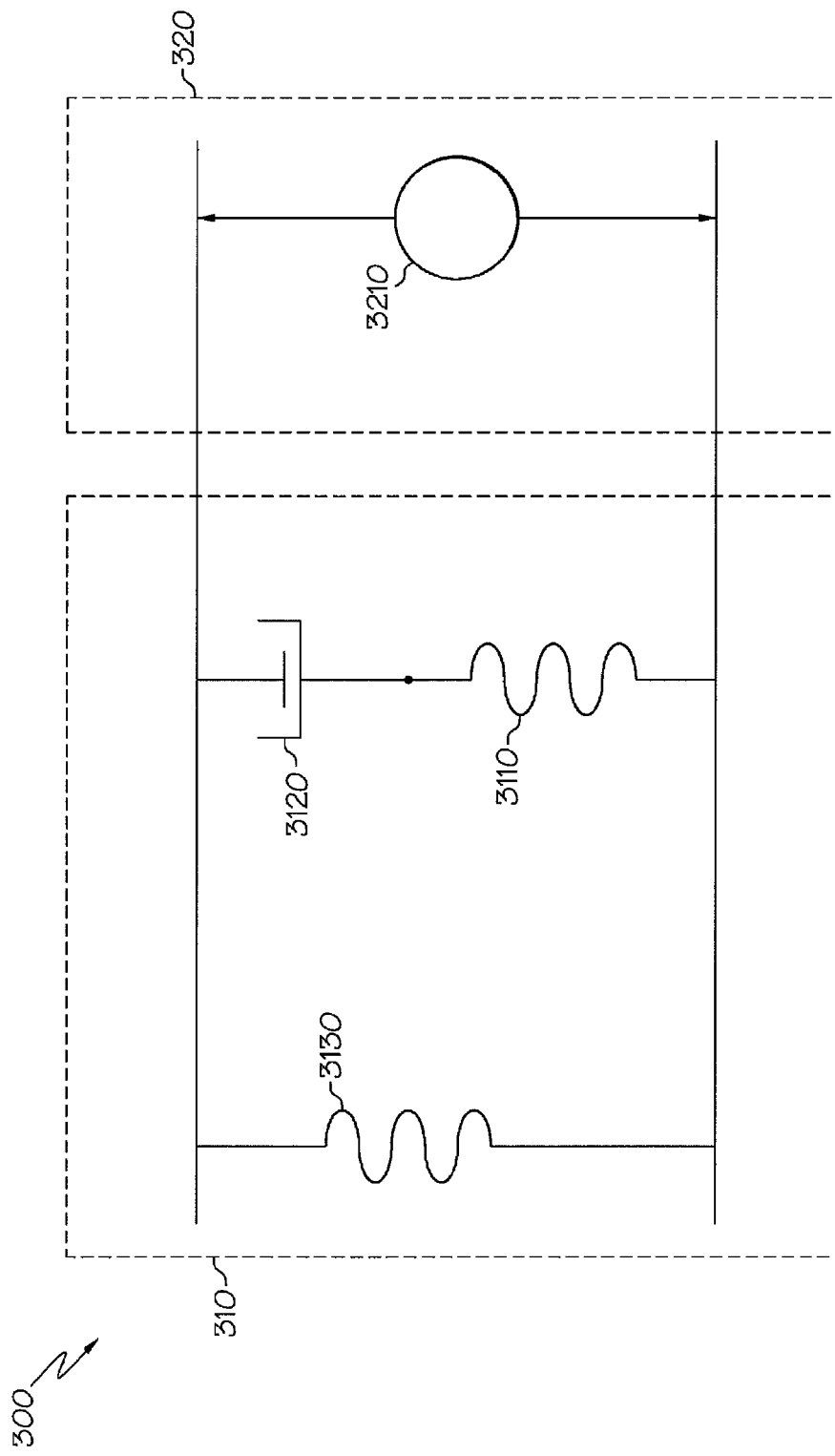
FIG. 3 is a schematic diagram of one exemplary embodiment of the hybrid actuator of FIG. 2.

FIG. 3 illustrates a schematic diagram of one exemplary embodiment of hybrid actuator 300 forming a portion of a strut in hybrid interface 230. Hybrid actuator 300 includes a passive mechanical system 310 coupled in parallel with an active portion 320. Passive mechanical system 310 includes a spring 3110 coupled in series with a damper 3120 (e.g., a dashpot). Also included in passive mechanical system 310 is a spring 3130 coupled in parallel with spring 3110 and damper 3120.

Although passive mechanical system 310 is illustrated as including one spring in series with one damper, various embodiments contemplate that passive mechanical system 310 may include multiple springs 3110 and/or dampers 3120 coupled in series with one another. Furthermore, passive mechanical system 310 may include multiple series-connected springs and dampers coupled in parallel with spring 3110 and damper 3120.

Similarly, passive mechanical system 310 may include multiple springs 3130 coupled in series with one another. Furthermore, passive mechanical system 310 may include multiple springs 3130, each coupled in parallel with spring 3110 and damper 3120.

Active portion 320 includes a non-contacting actuator 3210 (e.g., a voice coil, an electromagnetic actuator, an electrostatic actuator, and the like) coupled in parallel with passive mechanical system 310. Non-contacting actuator 3210 may include multiple series-connected non-contacting actuators 3210 and/or may include multiple non-contacting actuators coupled in parallel with non-contacting actuator 3210 and passive mechanical system 310.

With reference again to FIG. 2, hybrid interface 230 includes a controller 2320 in communication with non-contacting actuator(s) 3210, an IMU (e.g., IMU 2110 discussed below), and a controller (e.g., controller 2205 discussed below) in bus 220 (e.g., bus 220 discussed below). Controller 2320 is configured to receive signals from IMU 2110, and instruct non-contacting actuator 3210 (and passive mechanical system 310) to maneuver a payload (e.g., payload 210 discussed below) to a different position and/or attitude.

Payload 210 includes an IMU 2110 similar to IMU 1110 discussed above (see FIG. 1). IMU 2110 is coupled to controller 2320, and error signals between a commanded (i.e., desired) position and/or attitude of payload 210 and the IMU 2110 sensed position and/or attitude result in commands to hybrid actuator(s) 300 in a manner that enables payload 210 to have a new position and/or attitude, driving the error signals to zero. In changing the position and/or attitude of payload 210, controller 2320 instructs hybrid actuator 300 to make the change with respect to the center of mass of spacecraft 200 instead of the center of mass of payload 210, thereby minimizing the required stroke of hybrid actuator 300 (and passive mechanical system 310).

Bus 220 includes a controller 2205 that is utilized to control the output of inertial actuator 2210. Controller 2205 receives a signal from 6-DOF relative motion measurement system 3000, indicating the relative alignment of payload 210 with respect to bus 220. Any errors in alignment result in controller 2205 commanding inertial actuator 2210 to change the position and/or attitude of bus 220 such that payload 210 and bus 220 are aligned. Furthermore, controller 2205 receives signals from controller 2320, for reasons discussed below.

Inertial actuator 2210 is used to maneuver bus 220 to a new position so that bus 220 maintains or substantially maintains a relative position with respect to payload 210. Inertial actuator 2210 is also configured to change the position of bus 220 with respect to the center of mass of spacecraft 200 in synchronization with payload 210. That is, when inertial actuator 2210 receives the new position that payload 210 will change to, inertial actuator 2210 will begin to change the position of bus 220 so that bus 220 follows payload 210.

Controller 2205 is configured to receive signals 6-DOF relative motion measurement system 3000 and/or controller 2320, and instruct inertial actuator 2210 to change the position and/or attitude, respectively, of bus 220 at substantially the same time as hybrid actuator 300 adjusts the position and/or attitude of payload 210.

Although payload 210 and bus 220 will not always have the same relative position with one another at all times during the respective changes in position and/or attitude, payload 210 and bus 220 will have the same relative positions and/or attitude when inertial actuator 2210 and attitude control system 2220 are finished changing the positions and/or attitude of bus 220, respectively. That is, payload 210 and bus 220 will have the same relative position and/or attitude within a predetermined threshold (e.g., time, displacement of hybrid interface, etc.) of one another during any change in position and/or attitude.

Figure 4:
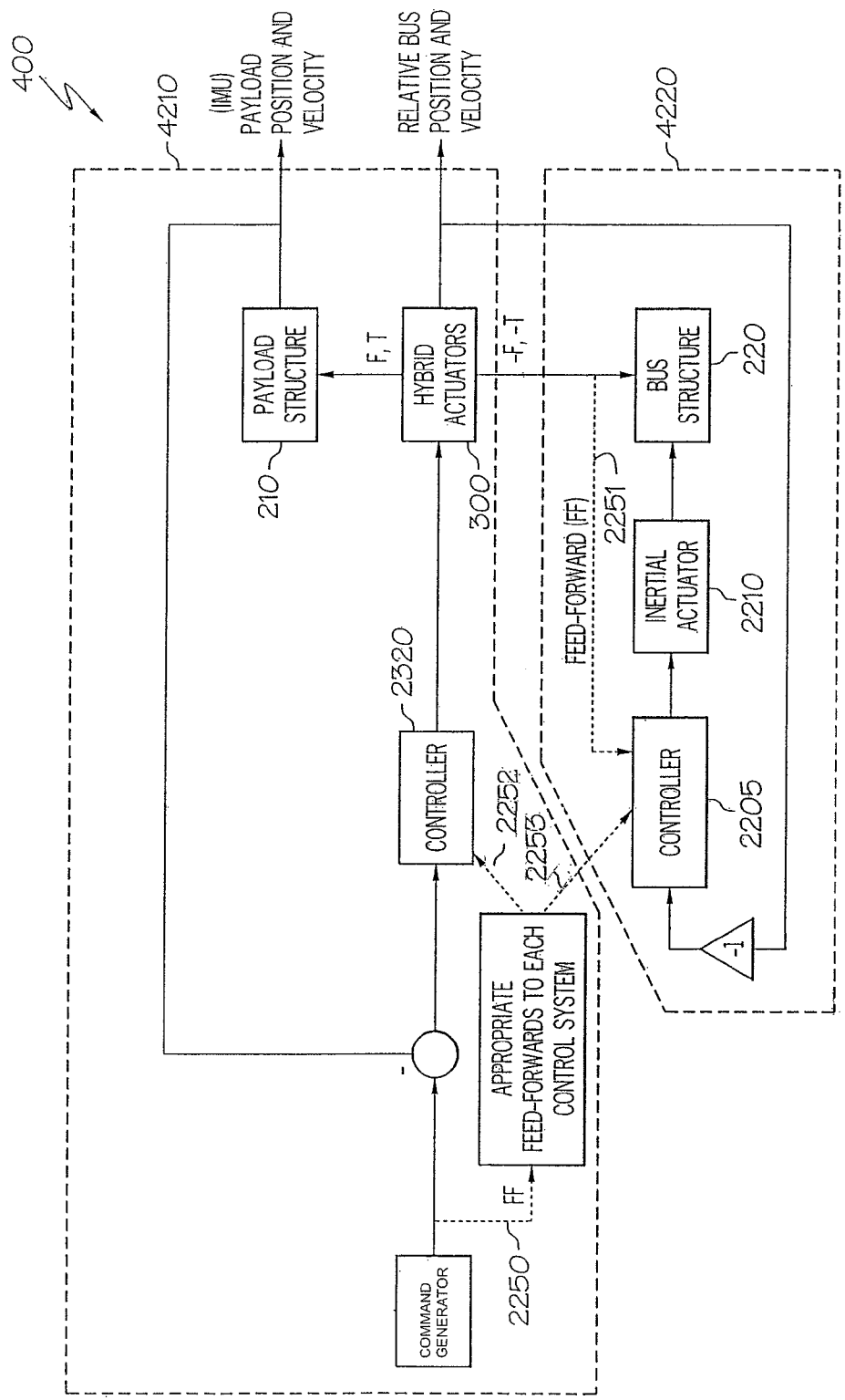
FIG. 4 is a block diagram of one exemplary embodiment of control architecture for the spacecraft of FIG. 2.

FIG. 4 is a block diagram of one exemplary embodiment of control architecture 400 for a spacecraft (e.g., spacecraft 200). As illustrated, control architecture 400 includes a payload control loop 4120 and a bus control loop 4220. As one skilled in the art will appreciate, as the isolation break frequency decreases between payload 210 and bus 220, spacecraft 200 essentially approaches two separate bodies in close formation. Accordingly, control architecture 400 should be such that agile and stable pointing of payload 210 and bus 220 may be achieved with no passive connection (e.g., passive mechanical system 310 of FIG. 3) at all.

The passive connection then simply imposes a stiffness large enough to substantially prevent payload 210 and bus 220 from drifting out of formation, but small enough to maximize the isolation performance and afford the ability to separate the isolation and pointing functions. Accordingly, the inclusion of a passive connection provides a more fault tolerant spacecraft. That is, if active portion 320 (see FIG. 3) malfunctions, spacecraft 200 (via passive mechanical system 310) is still capable of controlling the position and attitude of payload 210.

To control both portions of spacecraft 200, full, active control of the nine relevant degrees of freedom of payload 210 and bus 220 (e.g., the rotation of payload 210 (three degrees of freedom), the rotation of bus 220 (three degrees of freedom), and translation between payload 210 and bus 220 (three degrees of freedom)) should be achieved. As such, spacecraft 200 includes three torques from inertial actuator 2210 and six forces from the six hybrid actuators 300 of hybrid interface 230.

Spacecraft 200 also includes nine sensors (not shown): three sensors for the three axes of IMU 2110, and six sensors for the six deflections of the hexapod of hybrid actuators 300. The differential motion between payload 210 and bus 220 may be measured at the struts of hybrid interface 230 or other location on spacecraft 200 which enables the differential motion to be accurately measured or derived.

Feedback systems 4210 and 4220, which manage the nine degrees of freedom, may be implemented in such a way that they are decoupled and independent of one another. This is achieved through the use of geometric transformations and "feedforwards" 2250 and 2251. To accomplish this, geometric transformations and feedforward control are implemented with their own bandwidth.

The three degrees of freedom needed to rotate payload 210 are controlled by applying torques to payload 210 using the collection of strut forces from hybrid interface 230. In this situation, the inertia of payload 210 is being controlled, not the inertia of bus 220.

The three degrees of freedom needed to rotate bus 220 are controlled to achieve a "follow-up" to the rotation of payload 210. The angular information between payload 210 and bus 220 is obtained from the collection of strut deflections, and the torques are applied to bus 220 using inertial actuator 2210. In this situation, the inertia of bus 220 is being controlled, not the inertia of payload 210.

The three degrees of freedom needed for translation of payload 210 with respect to bus 220 may be actively controlled using the collection of strut forces from hybrid interface 230 to minimize translation at hybrid interface 230. The translation information is obtained from the collection of hybrid actuator 300 strut deflections, and forces are applied using the collection of hybrid actuators 300. Note that if the maneuver feedforwards 2250 are sufficiently accurate, passive mechanical system 310 (see FIG. 3) could do this entire job.

To achieve the necessary independence between control loops 4210 and 4220, payload 210 and bus 220 should be able to react against each other without causing coupling between payload 210 and bus 220. To accomplish this, the following feedforwards and transformations may be utilized:

Payload reaction feedforward 2251—inertial actuator 2210 is instructed to apply torque to oppose the control torque reacting into bus 220 through hybrid actuators 300. If the majority of these reactions are cancelled, that which remains will appear simply as a disturbance to bus 220 rotation, and not a stability consideration;

Bus reaction feedforward (not shown)—since the bus torque is produced by inertial actuator 2210, the bus torque does not react into payload 210. Accordingly, a bus reaction feedforward is not required here; and Geometry transformations—the collection of six hybrid actuators 300 (struts) should be controlled to work together to produce the desired forces and torques on payload 210.

To enable maneuvers whose frequency content exceeds the bandwidth of control loops 4210 and 4220, high-bandwidth actuators may receive feedforward commands 2250, which would result in substantially the desired maneuver even if the underlying loops were not present. Control loops 4210 and 4220 then act only to eliminate residual error. Examples of such feedforwards include:

Payload acceleration feedforward 2252—the control torques on payload 210 are computed based only on the inertia of payload 210;

Bus acceleration feedforward 2253—the control torques on bus 220 are computed based only on the inertia of bus 220; and The final outcome of any useful maneuver should be a rotation of the entire spacecraft 200 about its collective center of mass. Accordingly, in addition to the payload control torques, appropriate hybrid actuator 300 strut forces are also applied to null translation at hybrid interface 230, which is done with geometric transformations.

If hybrid actuators 300 are sufficiently higher in bandwidth than inertial actuator 2210, payload 210 may be moved to a new position and/or attitude faster than bus 220. As such, hybrid interface 230 is configured to include a sufficient amount of displacement or stroke such that bus 220 may be allowed to "lag" behind (i.e., follow-up error). Accordingly, bus control loop 4220 will continue to work to remove any follow-up error after payload 210 has reached its desired position and/or attitude.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

We claim:

1. A hybrid actuator for maneuvering a spacecraft payload coupled to a spacecraft bus, comprising:
   a non-contacting actuator; and
   a passive mechanical system coupled in parallel with the non-contacting actuator,
   wherein the passive mechanical system comprises:
      a first spring;
      a damper coupled in series with the first spring; and
      a second spring coupled in parallel with the first spring and the damper.

2. The hybrid actuator of claim 1, wherein the non-contacting actuator comprises one of an electromagnetic actuator and an electrostatic actuator.

3. The hybrid actuator of claim 1, wherein the non-contacting actuator comprises a voice coil.

4. A system for controlling motion of a spacecraft including a payload coupled to a bus, the system comprising:
   a hybrid actuator including:
      a non-contacting actuator coupled between the payload and the bus, and
      a passive mechanical system coupled in parallel with the non-contacting actuator, the hybrid actuator configured to maneuver one of a position and an attitude of the payload; and
   a maneuvering system coupled to the bus, and configured to maneuver the bus to substantially maintain one of a relative position and a relative attitude of the bus with respect to the payload,
   wherein the passive mechanical system comprises:
      a first spring;
      a damper coupled in series with the first spring; and
      a second spring coupled in parallel with the first spring and the damper.

5. The system of claim 4, wherein the non-contacting actuator comprises one of an electromagnetic actuator and an electrostatic actuator.

6. The system of claim 4, wherein the non-contacting actuator comprises a voice coil.

7. The system of claim 4, wherein the maneuvering system comprises one of a thruster, a reaction wheel assembly, a magnetic torquer, a solar sail, and a control moment gyroscope.

8. The system of claim 4, further comprising:
   a payload sensor in communication with the hybrid actuator, and configured to determine the one of the position and the attitude; and
   a relative six degrees of freedom motion sensor in communication with the maneuvering system, and configured to determine the relative motion of the bus with respect to the payload.

9. The system of claim 8, wherein the payload sensor is one of a gyroscope, an accelerometer, a star-tracker, and a focal plane detector.

10. The system of claim 4, wherein the hybrid actuator is configured to maneuver the payload with respect to a center of mass of the spacecraft.

11. The system of claim 10, wherein the maneuvering system is configured to maneuver the bus with respect to the center of mass of the spacecraft.

12. The system of claim 4, wherein the hybrid actuator further comprises at least five non-contacting actuators and at least five passive mechanical systems, and wherein:
   each non-contacting actuator is coupled in parallel with a respective passive mechanical system to form a hexapod configuration; and
   each non-contacting actuator and passive mechanical system is coupled between the payload and the bus.

* * * * *